United States Patent [19]

Schultz

[11] Patent Number: 4,773,925
[45] Date of Patent: Sep. 27, 1988

[54] ADJUSTABLE ROLL FORMING ARRANGEMENT

[75] Inventor: Stephen J. Schultz, Pittsburgh, Pa.

[73] Assignee: PPG Industries, Inc., Pittsburgh, Pa.

[21] Appl. No.: 61,950

[22] Filed: Jun. 15, 1987

[51] Int. Cl.⁴ .......................................... C03B 25/033
[52] U.S. Cl. ...................................... 65/106; 65/104; 65/107; 65/245; 65/253; 65/273
[58] Field of Search ................ 65/273, 253, 245, 104, 65/106, 107

[56] References Cited

U.S. PATENT DOCUMENTS

| | | |
|---|---|---|
| 1,530,499 | 3/1925 | Knode . |
| 2,820,541 | 1/1958 | Barnish et al. . |
| 3,088,580 | 5/1963 | Hughes . |
| 3,089,580 | 5/1963 | Dilgard . |
| 3,092,240 | 6/1963 | Tyler et al. . |
| 3,881,906 | 5/1975 | Ritter, Jr. et al. . |
| 4,054,438 | 10/1977 | Presta .................................. 65/107 |
| 4,210,134 | 7/1980 | Galindez ......................... 65/273 X |
| 4,226,608 | 10/1980 | McKelvey . |
| 4,292,065 | 9/1981 | Nedelec et al. ................. 65/273 X |
| 4,311,509 | 1/1982 | Reader et al. . |
| 4,556,406 | 12/1985 | Kahle . |
| 4,619,683 | 10/1986 | Halberschmidt et al. . |

Primary Examiner—Arthur Kellogg
Attorney, Agent, or Firm—Andrew C. Siminerio

[57] ABSTRACT

An adjustable roll forming arrangement for shaping heat softened glass sheets. Each end of a series of transversely curved, longitudinally spaced forming rolls are mounted on first and second longitudinally extending flexible members. The members may be adjusted so that each roll end is positioned along a desired longitudinal radius of curvature that can be modified by flexing the flexible member.

20 Claims, 6 Drawing Sheets

ADJUSTABLE ROLL FORMING ARRANGEMENT

BACKGROUND OF THE INVENTION

1. Field of the Invention

This invention relates to the shaping of heat softenable material sheets and, in particular, to an adjustable roll forming arrangement for shaping hot glass sheets of varying transverse and longitudinal configurations.

2A. Technical Considerations

In the manufacture of tempered shaped glass sheets, glass sheets are normally heated to their heat softening temperature, shaped by one of a variety of well known forming operations and cooled to impart at least a partial temper in the glass sheet. In particular, in a roll forming operation the glass sheet is deformed by gravity to assume a transverse and/or longitudinal configuration. The transverse curvature is formed by conveying the hot glass sheet over a series of transversely curved longitudinally spaced forming rolls at the exit end of a heating furnace. The longitudinal curvature is formed by mounting the individual forming rolls along a longitudinally extending arc.

Current automotive design requires a variety of different glass sheet shapes and curvatures. Generally, a roll forming apparatus includes transversely curved conveyor rolls with rigid shafts that are mounted on a rigid support along a fixed longitudinal sweep so that the apparatus is limited to shaping glass to a single transverse and longitudinal radius curvature. It would advantageous to have an adjustable roll forming arrangement wherein both the transverse roll profile and the longitudinal profile of the roll forming apparatus can be easily adjusted to correspond to the transverse and longitudinal radius of different curved glass sheet configurations.

2B. Patents of Interest

U.S. Pat. Nos. 1,530,499 to Knode; 2,820,541 to Barnish et al.; 3,088,580 to Hughes; 3,089,580 to Dilgard and 3,092,240 to Tyler et al., each disclose an adjustable conveyor roll. In particular, Knode teaches a three part conveyor roll wherein the outer two sections of the roll may be pivoted upward relative to the horizontal center section. The remaining patents each teach a continuously curved conveyor roll wherein the transverse radius of curvature of the rolls can be varied. In each patent, the roll assembly is suspended at its opposite ends by pivoting support arms and the radius of curvature of the rolls is adjusted by pivoting the support arms so as to move the opposite ends of the conveyor rolls closer or further apart. In each of these patents the conveyor rolls are free wheeling i.e., they freely rotate about a central shaft and do not include a drive assemble to directly rotate the conveyor roll.

U.S. Pat. No. 3,881,906 to Ritter et al teaches a roll forming apparatus with a transition section between the heating furnace and shaping station. The forming rolls in the transition section have successively decreasing transverse radii of curvature, changing from a flat roll at the upstream end of the transition section to a forming roll with a configuration similar to those in the shaping station.

U.S. Pat. No. 4,311,509 to Reader et al., discloses a conveyor roll comprised of a rigid curved shaft and plurality of cylindrically shaped glass sheet support members mounted around the curved shaft. Each support member includes a hub having a loosely fitting tongue and groove connecting arrangement and an outer collar of material that does not mar a hot glass sheet when in contact therewith. The tongue and groove arrangement interconnect the support members so that when torque is applied to one end of the hubs of the conveyor roll, the glass engaging surface of the collars rotate in unison, preferable at a uniform speed, to convey the curved glass sheet. Each roll is supported within the quench section of a roll forming apparatus on a rigid frame.

U.S. Pat. No. 4,226,608 to McKelvey discloses flexible shaping rolls comprised of relatively tightly wound coil springs mounted on pivoting end supports by stub shafts. The transverse radius of curvature of the rolls is adjusted by positively pivoting the upper portion of the end supports in order to move bearing housings, which support the stub shafts, inwardly or outwardly, and simultaneously varying the angularity thereof. Each roll is mounted at the same elevation within a roll forming operation on a rigid frame.

U.S. Pat. Nos. 4,139,359 to Johnson et al., and 4,556,406 to Kahle teach roll forming operations wherein transversely extending curved conveyor rolls are longitudinally spaced along a longitudinally extending arc in order to impart a longitudinal curvature in the shaped glass sheet. In particular, Kahle teaches the positioning of the ends of each curved roll along a different longitudinally extending arc so as to shape a heat softened glass sheet into a configuration having a longitudinal radius of curvature that varies in a direction transverse to the glass sheet.

U.S. Pat. No. 4,619,683 to Halberschmidt et al. teaches an adjustable glass sheet blowing assembly for tempering glass sheets. Flexible tubular nozzle arrangements are secured to deformable rails that have an adjustable center support. The center support is adjusted to change the curved configuration along which the nozzle arrangement is mounted. Additional deformable rails may be used to flex the nozzle arrangement in their transverse direction.

SUMMARY OF THE INVENTION

An object of this invention is to provide an adjustable roll forming apparatus for shaping glass sheets having a variety of longitudinally extending radii of curvatures. The roll forming apparatus includes longitudinally spaced transversely extending forming rolls positioned on a support frame to support a heat softened glass sheet as it is conveyed thereover. The forming rolls are supported on the frame along a first longitudinal radius of curvature and the support is adjustable such that the rolls are movable from along the first longitudinal radius of curvature to along a second longitudinal radius of curvature. The forming rolls includes first and second mounting posts secured to first and second flexible bars, respectively, that extend along opposing sides of the frame. The curvature of each of the bars corresponds to a desired longitudinal radius of curvature along which the rolls are mounted. The flexible bars may be automatically adjustable so as to automatically change the longitudinal radius of curvature along which the forming rolls are mounted. The curvature of each of the bars may be individually adjustable such that opposing ends of the forming rolls are positioned along different longitudinal radii of curvature.

Another object of this invention is to provide a roll forming apparatus having a frame which includes a forming roll support structure pivotally supported on a mainframe. The roll support structure pivots about an axis horizontally transverse to the conveyed direction of the heat softened sheet over the rolls. The forming rolls which are mounted on the roll support structure may have a concave upward transverse configuration that is adjustable. A quench station with quench rolls mounted along a continuation of the longitudinal radius of curvature along which the forming rolls are mounted, directs cooling fluid at opposing faces of the heat softened shaped glass sheet. The transverse radius of curvature of the quench rolls corresponds to the transverse radius of curvature of the forming rolls.

A further object of the present invention is to provide a method of shaping heat softened sheet material. First and second mounting portions of each of a series of longitudinally spaced transversely extending forming rolls are positioned on first and second longitudinally extending flexible supports on a support frame. The flexible supports are flexed to correspond to a desired continuous arcuate path corresponding to a desired longitudinal radius of curvature for each of the rolls along each mounting portions. The sheet material is then conveyed over the series of rolls to shape it. The support frame is pivotable about an axis horizontally transverse to the conveyed direction of the sheets over the rolls. The rolls may have a concave upward transverse curvature configuration that may be adjusted to modify its transverse curved configuration.

DETAILED DESCRIPTION OF THE INVENTION

The adjustable roll forming apparatus and operation of the present invention is presented in connection with shaping heat softened glass sheets, but is understood that the invention can be used at any forming, shaping or conveying operation wherein the flexibility of an adjustable forming operation will be beneficial.

Figure 1:
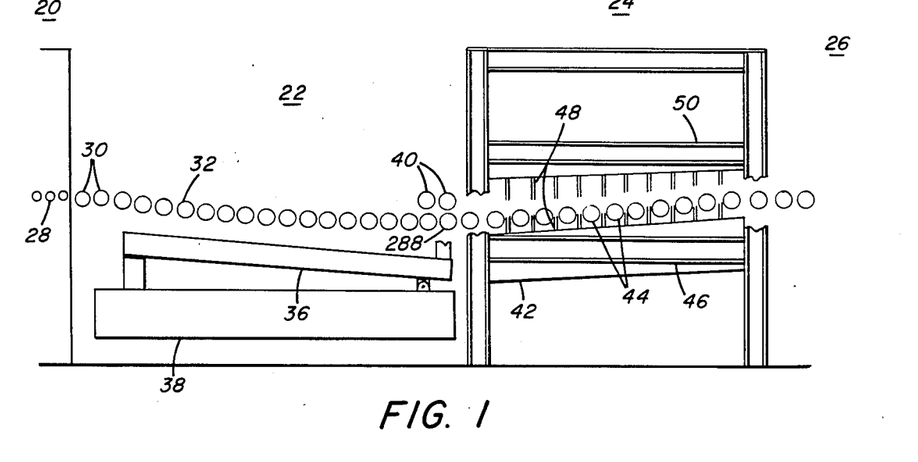
FIG. 1 is a schematic side view of a roll forming operation illustrating a furnace, roll forming station, quenching station and cooling station incorporating the present invention.
Figure 2:
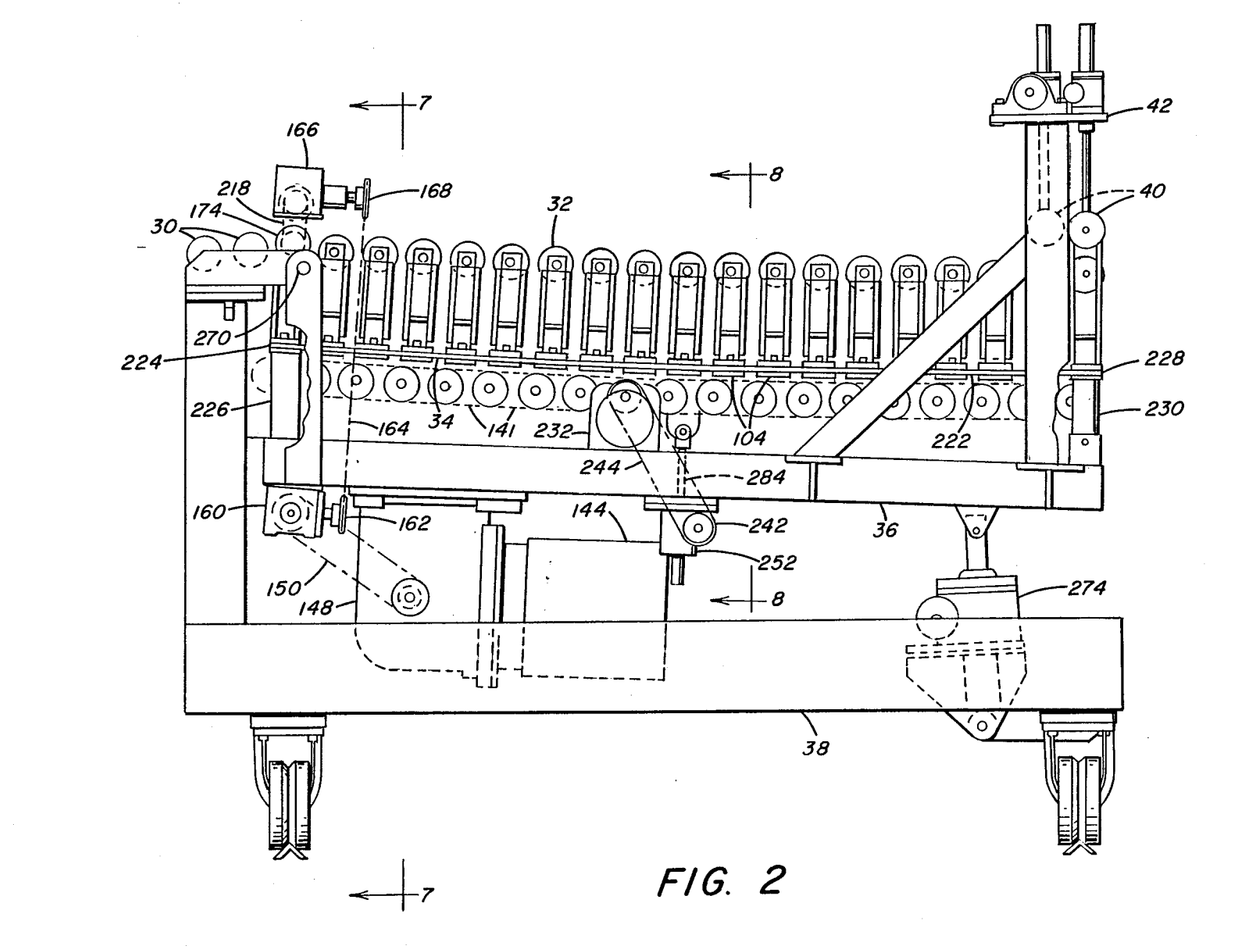
FIG. 2 is a side view of the roll forming station of the roll forming apparatus illustrated in FIG. 1, incorporating the adjustable features of the present invention.
Figure 3:
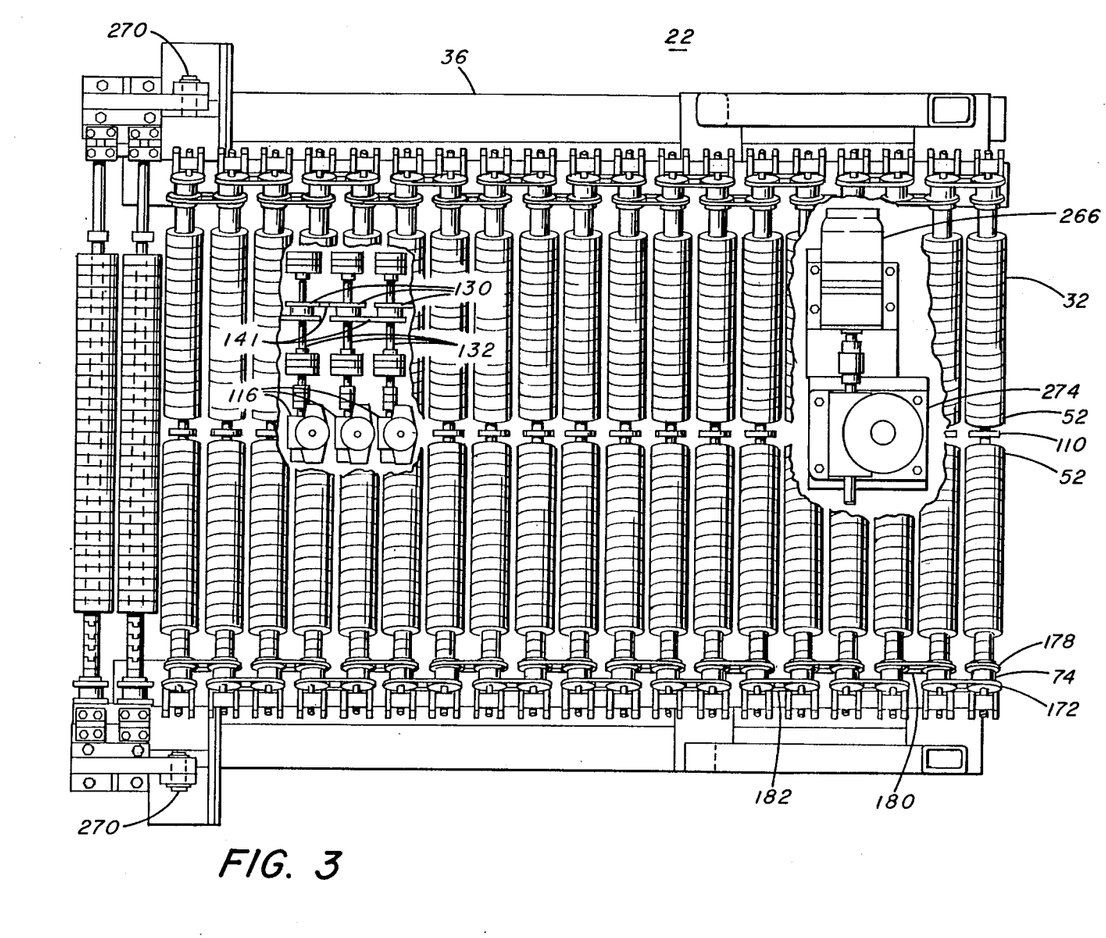
FIG. 3 is a top view of the invention illustrated in FIG. 1 with portions removed for clarity.

A typical roll forming apparatus as illustrated in FIG. 1 incorporates a glass sheet heating furnace 20 followed by a roll forming station 22, a quenching station 24 and a cooling station 26. The individual components are generally aligned in a closely spaced end to end relation. U.S. Pat. Nos. 4,139,335 to Johnson et al., and 4,556,406 to Kahle are representative of the current roll forming technology and their teachings are hereby incorporated by reference. Conveying rolls 28 are longitudinally spaced and transversely positioned within the furnace 20 to support and convey the glass sheet therethrough. As it is heated to its heat softening temperature, typically in the range of 1150° F. to 1220° F. (620° C. to 660° C.) at the exit end of the furnace 20 the glass sheet is moved over transfer rolls 30 into forming station 22 which is the subject of this invention. Referring to FIGS. 2 and 3, the roll forming station 22 includes a plurality of forming rolls 32. Successive forming rolls 32 are arranged in spaced relation downstream from one another on a leaf spring arrangement 34 along a smooth arcuate path of a radius related to the longitudinal curvature of the longitudinal edges of the glass sheet to be shaped. The arrangement 34 in turn is suspended on a pivoting frame 36, as will be discussed later, which is mounted on a mainframe 38. As the heat softened glass sheet G is conveyed over the forming rolls 32, it deforms by gravity and assumes a transverse radius of curvature corresponding to curvature of the forming roll 32, and a longitudinal radius of curvature corresponding to the arcuate path along which the rolls 32 are mounted.

As shown in FIGS. 1 and 2, the roll forming section 22 may have an additional set of upper forming rolls 40 similar in design to the forming rolls 32. These forming rolls 40 are supported from frame 42. The upper forming rolls 40 are generally mounted directly over a corresponding lower forming roll 32 and are adjusted so that the lower surface of each upper forming roll 40 is uniformly spaced above the upper surface of a corresponding lower forming roll 32. As a result, the transverse curvature of the upper forming roll 40 is slightly sharper than the transverse curvature of a corresponding lower forming roll 32. This spaced relation is slightly more than the thickness of the glass sheet passing therebetween.

After passing through the roll forming station 22, the glass sheet is conveyed through the quench station 24 on quenching rolls 42 as illustrated in FIG. 1. The rolls 44 have the same transverse curvature as the forming rolls 32 and support the shaped glass sheet during quenching. The rolls 44 may be similar in design to the adjustable forming rolls 32, to be discussed later, or may be fixed radius conveyor rolls as disclosed in U.S. Pat. No. 4,311,509 Reader et al., whose teachings are hereby incorporated by reference. The rolls 42 are mounted on quenching frame 46 along a continuation of the curved path formed by the forming rolls 32. This arcuate path continues uninterrupted through the quench section 24 until such time that the glass sheet is cooled and is sufficiently rigid to retain this curved configuration when conveyed along a horizontal path.

The quench station 24 also includes nozzles 48 spaced above and below the glass sheet G. The nozzles 48 extend from an air plenum 50 having a lateral radius of curvature that approximates the transverse curvature of the glass sheet G. Successive nozzle and plenum assemblies positioned along a longitudinal path approximating the curved path of the glass sheet G through the quench section 24 direct cooling fluid at the major surfaces of the shaped glass sheet G to impart a temper.

The glass sheet exits the quench station 24 and is conveyed into the cooling station 26 where cooling continues until the shaped glass sheet can be handled for additional operations.

Figure 4:
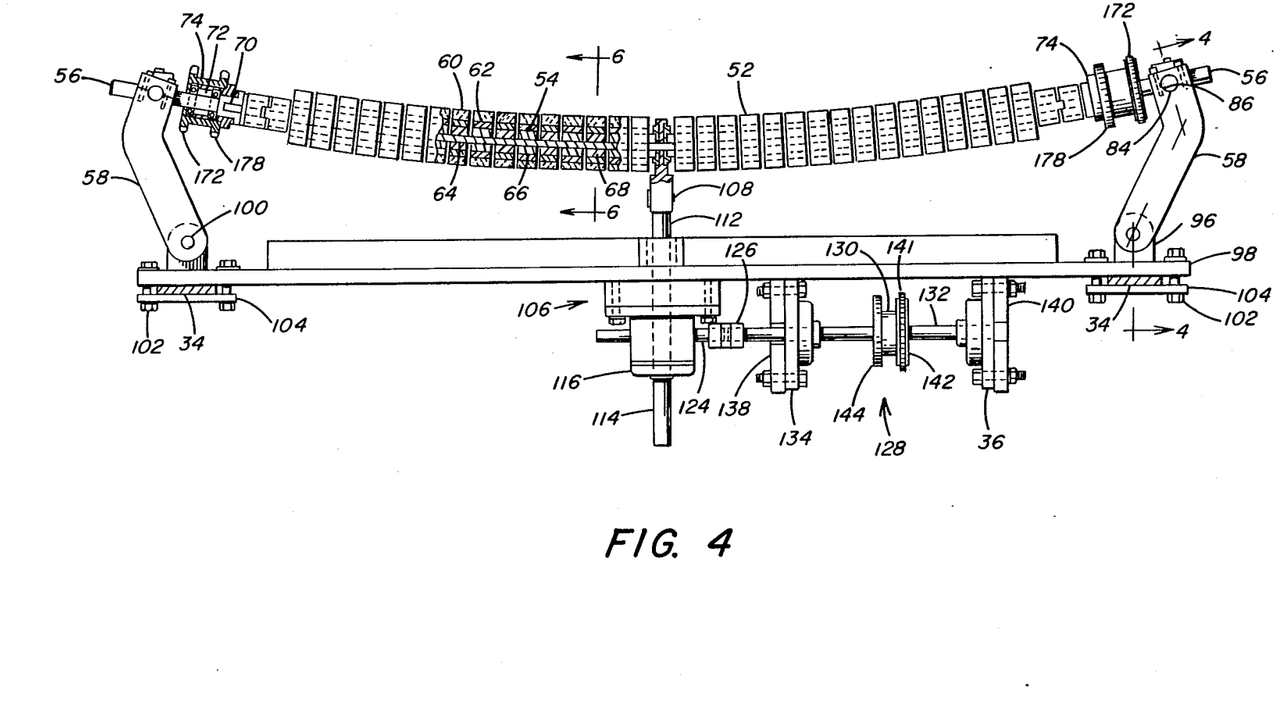
FIG. 4 is an elevation view of a preferred embodiment of the conveyor roll illustrated in FIGS. 2 and 3.
Figures 5, 6:
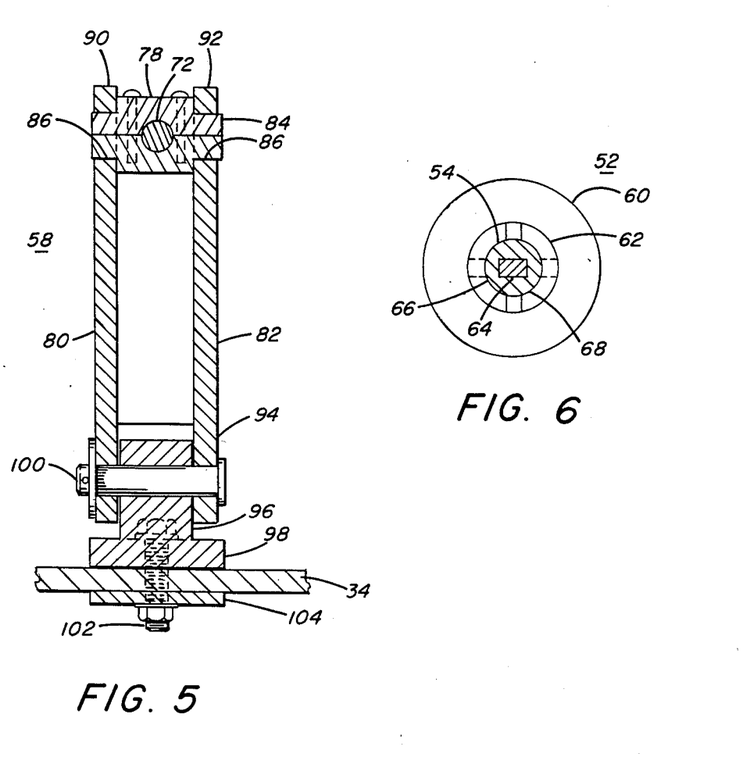
FIG. 5 is a view through line 5—5 of FIG. 4 of the conveyor roll showing the end support.
FIG. 6 is a view through line 6—6 of FIG. 4 showing the collar and hub of the glass sheet support members of the conveyor roll.

The transverse curvature of the forming rolls 32 may be adjusted at any convenient fashion. Although not limited in the present invention, in a preferred embodiment of the invention illustrated in FIGS. 4 through 6, the conveyor roll assembly is similar to that disclosed in U.S. patent application Ser. No. 916,071 to Schultz, which teachings are hereby incorporated by reference. The adjustable radius forming roll 32 includes a plurality of glass sheets support members 52 rotatably and interconnectably mounted on a flexible shaft assembly 54. End portions 56 of the roll 32 are pivotively mounted on pivoting end supports 58. Although not limiting in the present invention, the glass sheet support members 52 preferably include an outer cylindrically shaped collar 60 made of heat resistance material and a hub 62 as shown in FIGS. 4 and 6. The collars 60 may be press fit or glued onto the hubs 62. The members 52 are interconnected by a tongue and groove arrangement, as disclosed in U.S. Pat. No. 4,311,509 to Reader et al.

The shaft assembly 54 includes a bar 64 and an outer sleeve 66 as shown in FIGS. 4 and 6. The bar 64 preferable has a rectangular cross-section and is made from spring steel. The sleeve 66 includes cylindrical members 68 alternating with resilient washers or O-ring (not shown). The diameter of the sleeve 66 is such that the glass sheet support member 52 may fit over and freely rotate about the sleeve 66 while maintaining a smooth and essentially continuous glass sheet supporting surface. The cylindrical members 68 of the sleeve 66 may be of any length that allows the shaft 54 to flex and the glass sheet support members 52 to rotate thereabout. Although not limited in the present invention, the members 68 are preferably ¼ inch to 1 inch (0.635 cm to 2.54 cm) long.

As shown in FIG. 4, each end 70 of the bar 64 is pinned to connecting shaft 72 within double sprocket 74. The shaft 72 extends through the sprocket 74 and end 76 is clamped by pivot block 78 of pivoting end support 58 as shown in FIG. 5. The pivoting block 78, which is positioned between parallel legs 80 and 82 of the pivoting end support 58, includes extending stub portions 84 that are positioned in corresponding grooves 86 at the upper end 88 of leg portions 80 and 82 of the supporting end support 58. Blocks 90 and 92 are mounted overtop of the stub portions 84 and connected to the upper ends 88 of the leg portions 80 and 82, respectively, to rotatably capture the stub portions 84 therebetween. As a result, shaft 72 which passes through and is held in position by pivot blocks 78 can pivot at the upper ends of the pivoting support end support 58 about the axis defined by the stub portions 84. The lower end 94 of the legs 80 and 82 straddles a mounting block 96 that is fixed to roll frame 98. Pivot pin 100 extends through the lower ends 94 of members 80 and 82 of the pivoting arm 58 and the mounting block 96 to form a pivoting connection. Roll frame 98 is mounted on the leaf spring assembly 34 of the pivoting frame 36 via bolts 102 and backing plate 104.

Figure 7:
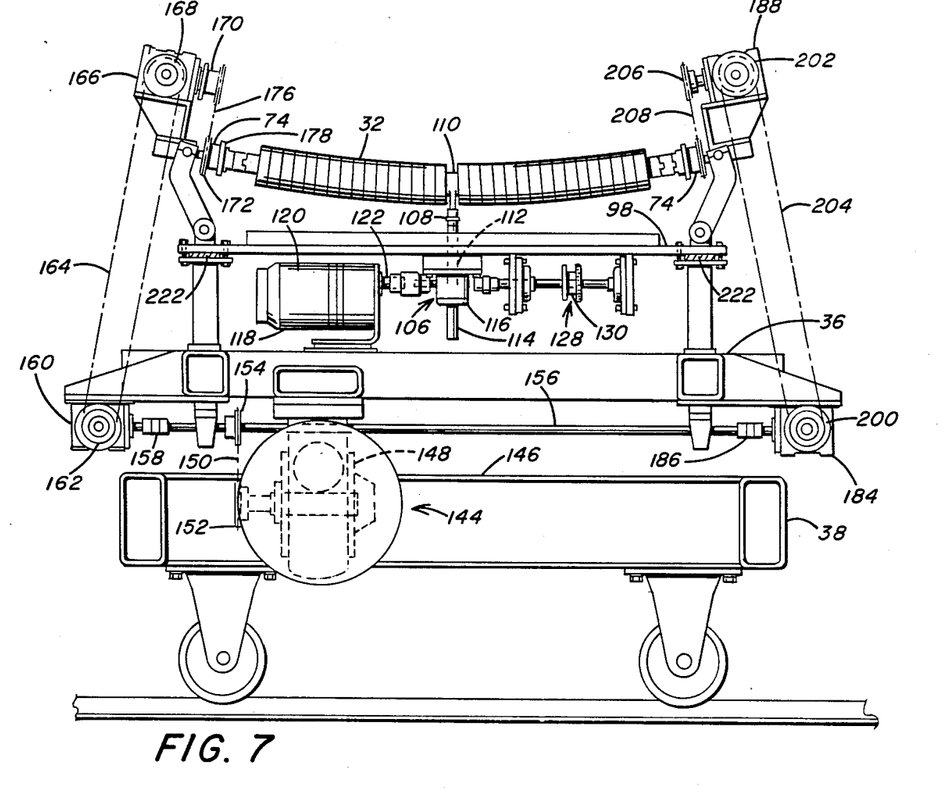
FIG. 7 is a view through line 7—7 of FIG. 2 illustrating the conveyor roll flexing arrangement and conveyor roll drive arrangement of the present invention.

Referring to FIGS. 4 and 7, the forming roll 32 is adjusted by a flexing arrangement 106. Although not limiting in the present invention, the flexing arrangement 106 is preferable located at the center of each roll 32 and includes a hold down device 108 which captures bar 64 with a collar assembly 110. The hold down device 108 is pinned to a vertical post 112 which includes a lower portion 114 having gear engaging teeth (not shown) that extend into the screw jack 116 to engage a worm gear (not shown). A flexing drive 118 includes a motor 120 (shown in FIG. 7 only) with drive shaft 122 extending through a worm gear screw jack 116 such that rotation of the shaft 122 by the motor 120 will reciprocate the hold down device 108 via the screw jack 116 to control the transverse radius of curvature of the each roll 32.

It should be appreciated that by incorporating a separate drive at each roll 32 the transverse curvature of each roll 32 can be individually controlled so that, if required, the curvature of the rolls can vary from roll to roll on the same roll forming assembly. This feature is particularly useful where a transitional area is required between the flat transfer rolls 30 and curved forming rolls 32 in order to provide a smooth transition from a flat shape to curved shape. The transitional section would include the first few forming rolls 32 on frame 36 adjacent to the last downstream flat transfer roll 30. Successive rolls 32 would have a decreasing transverse radius of curvature until the forming rolls 32 were flexed to the desired curved configuration.

It is further noted that, if required, each of the forming roll flexing arrangements 106 can be interconnected so that a number of forming rolls 32 may simultaneously adjusted. Although not limiting in the present invention, in the particular embodiment illustrated in FIGS. 4 and 7, the shaft 124 extends from the jack screw 116, and through coupling 126, to interconnecting flexing arrangement 128 which includes a double sprocket 130 on a shaft 132 rotatably mounted through bearing blocks 134 and 136 to plates 138 and 140 of frame 98. The interconnecting arrangement 128 illustrated in FIG. 4 would be repeated for the remaining rolls 32. Chain assemblies 141 (shown in FIGS. 2 and 3 only) interconnect alternate pairs of inner teeth 140 and outer teeth 142 on the double sprockets 130 so that a single drive 118 (shown in FIG. 7 only) may be used to rotate shafts 124 on all the forming rolls 32 and simultaneously reciprocate hold down device 108 and post 112 of the roll forming flexing arrangements 106 to control the transverse radius of curvature of the rolls 32. The forming rolls 32 may be adjusted to the required curvation prior to conveying the glass sheet G thereover, or the rolls 32 may be flexed while conveying the glass sheet G to further shape it.

In operation, in order to change the transverse curvature of the forming roll 32, sprocket 130 is rotated which in turn engages the screw jack 116 through coupling 126 and shaft 124. The screw jack 116 raises or lower post 112 and collar 110, thus displacing the center of the forming roll 32. As the center of the bar is displaced and the shaft assembly 54 is flexed, ends 76 of the connecting shafts 72 rotate angularly about the stub portions 84 at the upper end 88 of the pivoting end supports 58. When the transverse curvature of the forming roll 32 increases, i.e. the transverse radius of curvature decreases, the hold down device 108 pulls the center of the roll 32 downward to decrease the distant between the pivot blocks 78 at end of the forming roll 32, thus causing the pivoting end support 58 on the left side of FIG. 4 to rotate clockwise about pivot pin 100 on the roller frame 98 and the pivoting end support 58 on the right hand side to rotate counterclockwise. When the transverse curvature of the roll 32 decreases, i.e., the transverse radius of curvature increases, the hold down device 108 moves upward to reduce the curvature of the roll 32 and pivot the end supports 58 in a direction opposite to that previously described.

Referring to FIGS. 3 and 4, there is no interconnection between adjacent hub members 62 at the center of the roll 32 because of the location of the collar 110 of the flexing arrangement 106. As a result, in order to drive all the glass support members 52 via hub members 62 on both sides of the collar 110, the roll 32 is driven from both ends.

Referring to FIG. 4, collars 62 at the ends of each roll 32 are connected to double sprocket assembly 74 in a manner similar to that taught in U.S. patent application Ser. No. 916,071 to Schultz. Conveyor roll drive 144 as shown in FIGS. 2 and 7 is mounted in cross beam 146 of the mainframe 38 and includes a motor 148 and chain 150 that connects the sprocket 152 of the motor 148 with the sprocket 154 on drive shaft 156. To drive the left side of the roll 32 as viewed in FIG. 7, drive shaft 156 is connected through coupling 158 to lower right angle gear box 160 mounted on pivoting frame 36. The gear box 160 includes a sprocket 162 and chain 164 that is linked to upper right angle gear boxes 166 through sprocket 168. The upper gear box 166 further includes sprocket 170 which is linked to the outer sprocket 172 of the double sprocket 74 of a drive roll 174 of the rolls 32 through chain 176. The double sprocket 74 also includes a inner sprocket 178 which is connected by a drive chain 180 to the inner sprocket 178 of a double sprocket 74 mounted on an adjacent conveyor roll 32, as shown in FIG. 3. Similarly the outer sprocket 172 of the double 74 of adjacent forming rolls 32 are alternately connected by drive chain 182 to the outer sprocket 172 of the double sprocket 74 of the adjacent conveyor roll 32. This interconnection between inner and outer sprockets of the double sprocket 74 by the drive chains continues between adjacent conveyor rolls 32 as shown in FIG. 3 and may be extended as far as needed depending the number of conveyor rolls in the system. The right side of the forming roll 32 in FIG. 7 is driven in a similar fashion. Drive shaft 156 is connected through a coupling 184 to lower right angle gear box 186 which is linked to upper right angle gear box 188 through sprockets 200 and 202 and drive chain 204. Sprocket 206 of the upper box 188 is linked to the double sprocket 74 on the right hand portion of the drive roll 174 through chain 208 which in turn drives the right hand side of the remaining rolls 32 in a manner similar to that discussed supra.

Figure 9:
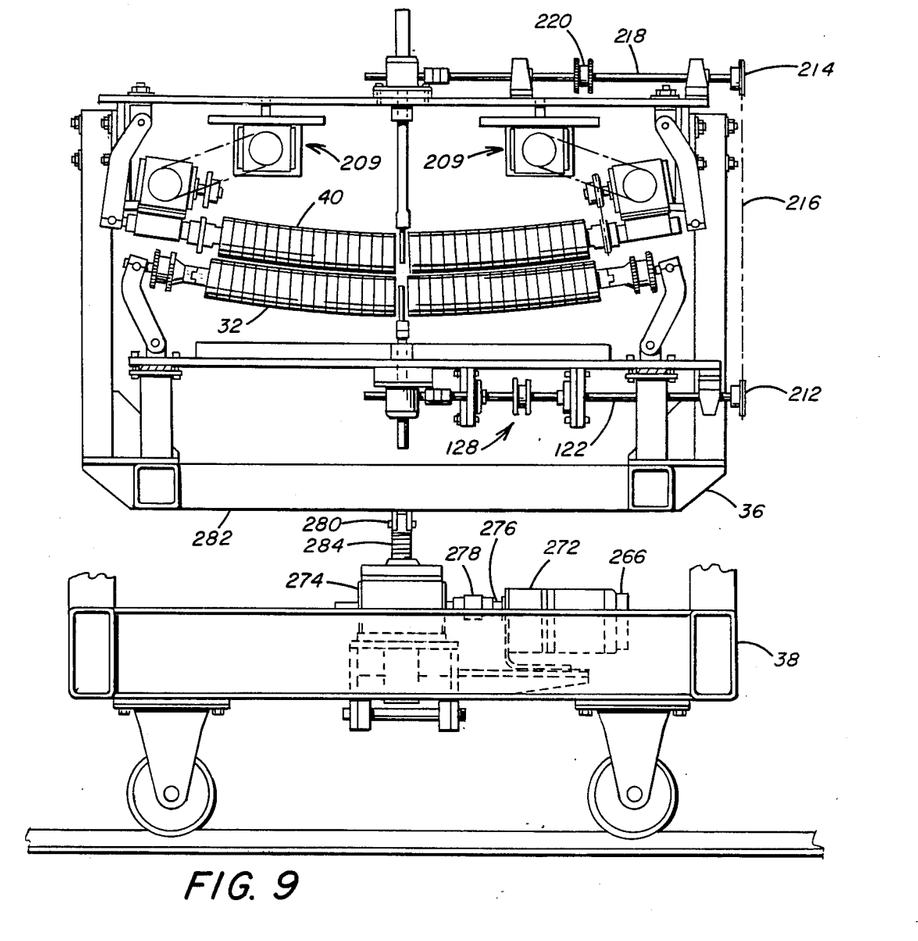
FIG. 9 is an end view of FIG. 2 showing the support frame tilting arrangement.

If required, additional roll drives 144 may be used to drive individual forming rolls or groups of forming rolls. Furthermore, upper forming rolls 40 may be connected through drive chains (not shown) to the lower forming rolls 32 so that lower drives 144 may also drive the upper forming rolls 40. As an alternative, upper forming rolls 40 may use a separate drives and gear box arrangement 209 as shown in FIG. 9. In a roll forming arrangement with multiple upper forming rolls 40, sprocket 210 on the upper rolls 40 may be a double sprocket similar to sprocket 74 on the lower rolls 32 such that adjacent upper rolls 40 may be interconnected by drive chains (not shown) and driven by a single motor is a manner similar to that discussed, supra, with respect to the lower forming rolls 32.

While the invention has been described in connection with a driven adjustable roll, wherein the center of the rolls are displaced vertically to adjust the transverse radius of curvature of the roll, one skilled in the art will appreciate that the invention is not necessarily so limited. For example, the adjustable roll may not necessarily be a driven roll, but rather have support members 52 that freely rotate about the shaft assembly 54. In addition, the hold down device 108 is not necessarily limited to act only at the center of the shaft assembly 54. It may be positioned anywhere along the length of the shaft 54 between the end portions 56. Furthermore, multiple hold down devices may be used on a single forming roll 32 to further adjust and modify the transverse curvature of the roll.

In keeping with the teachings of the present invention, it would be obvious to one skilled in the art to use the forming roll 32 as described, supra, for the upper forming rolls 40 as shown in FIGS. 2 and 9. The rolls 40 would be similar in design to that of the lower forming rolls 32, except that collars similar to the collars 60 of the glass sheet support members 52 would contact the glass sheet with their lower rather than their upper portions. In addition, a flexing arrangement would be positioned above rather than below the roll. It is apparent that to increase the transverse curvature, i.e. decrease the radius of curvature, a post member from the flexing arrangement would move the center of the roll downward and to decrease transverse curvature, i.e., increase the radius of curvature, the post would the move the center upward. In addition, the flexing arrangement 128 for the lower rolls 32 may be used to flex the upper rolls 40. Although not limiting in the present invention, in the particular embodiment illustrated in FIG. 9, shaft 122 extends from the flexing arrangement 128 of the roll 32 and is connected to the flexing arrangement of the upper roll 40 through sprockets 212 and 214, drive chain 216 and drive shaft 218. In addition, shaft 218 can include a double sprocket 220 to interconnect the flexing arrangement of adjacent upper rolls 40 in a manner similar to that discussed, supra.

Figure 8:
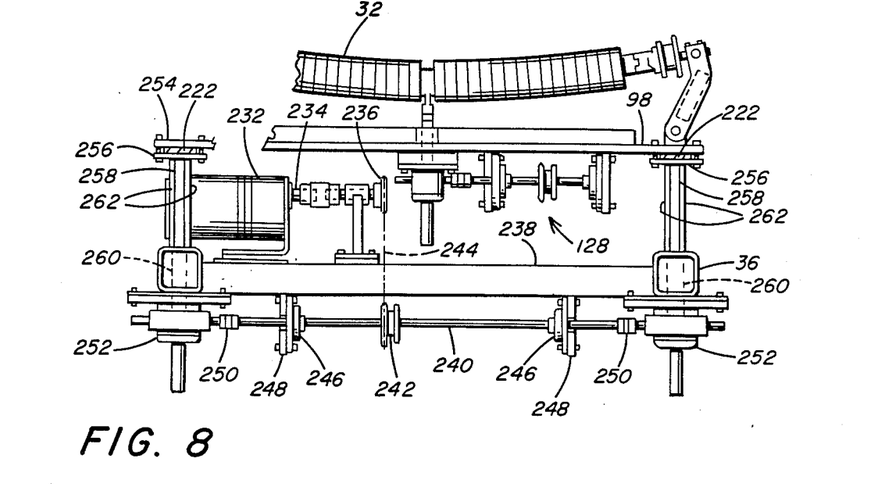
FIG. 8 is a view through line 8—8 of FIG. 2 illustrating the leaf spring mounting and flexing arrangement of the present invention.

As discussed, supra, in order to impart a longitudinal curvature to the glass sheet G as it is conveyed through roll forming station 22, the rolls 32 are mounted along a smooth arcuate longitudinal path in the direction in which the glass sheet is being conveyed. In the preferred embodiment of the invention, the rolls are mounted on the leaf spring assembly 34 as illustrated in FIG. 2. Leaf spring assembly 34 includes a leaf spring 222 with end 224 fixed to post 226 on pivoting frame 36 and end 228 connected to pivoting post 230 of the frame 36. The spring mounting surface of posts 226 and 230 may be inclined downwardly in the direction of the spring 222 curvature in order to approximate the curvature of the spring. If desired, the spring 222 may be pivotally mounted atop posts 226 and 230. The curvature of the spring 222 may be adjusted to change its curved configuration so that the rolls 32 mounted thereon are repositioned along a different longitudinal radius of curvature without the necessity adding or removing shims, blocks, etc., to adjust the roll height and position of each individual roll 32. In the particular embodiment of the invention illustrated in FIGS. 2 and 8, the center of the leaf spring 222 is vertically displaced to change the longitudinal radius of curvature of the forming arrangement in the shaping station 22. Specifically referring to FIG. 8, motor 232 which includes drive shaft 234 and end sprocket 236, is mounted on cross beam 238 of pivoting frame 36 and linked to shaft 240 through sprocket 242 and drive chain 244. The shaft 240 extends through bearing blocks 246 and mounting plate 248 to coupling 250 which connects the shaft 240 with screw jack assembly 252. The leaf spring 222 is sandwich between hold down plates 254 and 256. Post 258 extends downward from the lower plate 256. In a manner similar to that discussed, supra, with respect to the hold down assembly 108 of the flexing arrangement 106, in operation, a lower portion 260 of the post 258 includes gear engaging teeth (not shown) which extends into screw jack 252 to engage a worm gear (not shown) therein, such that rotation of the drive shaft 240 by the drive 232 will reciprocate post 258 in a vertical direction via screw jack 252. If required, guides 262 may be positioned on frame 36 to help maintain vertical displacement of the post 258.

It has been found that a significant change in the longitudinal radius of curvature may be effected with only a small amount of vertical displacement at the center of the leaf spring 222. For example, referring to FIG. 10, a leaf spring with an arc length of 60 inches (152.4 cm) having a longitudinal radius of curvature, R, originally set at 7200 inch (182.9 meters) has a downward center to deflection, D, of 0.0625 inches (0.16 cm). A longitudinal radius of curvature of 720 inch (18.3 meters) requires a center deflection of 0.625 inches (1.59 cm). As a result, a change from a 7200 inch to 720 inch longitudinal radius of curvature requires a change in center deflection of only 0.56 inches (1.42 cm).

Figure 10:
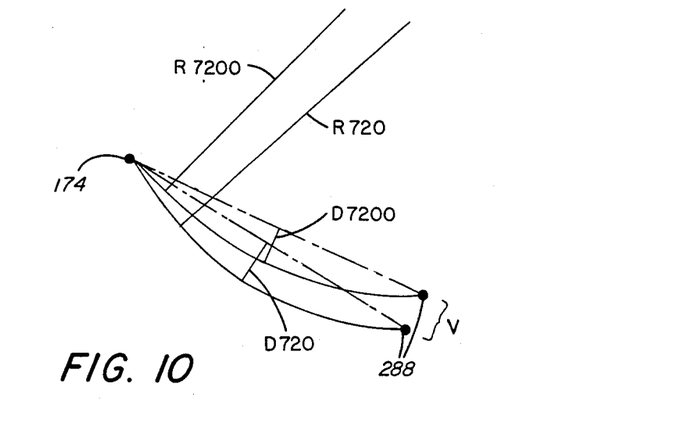
FIG. 10 is a schematic view illustrating the positions of the leaf spring arrangement for various longitudinal radius configurations.

The mounting arrangement at ends 224 and 228 of the leaf spring 222 on the frame 36 allows the chord length, C, of the spring 222 to change as the longitudinal radius curvature changes but it should be noted that, as with the center deflection, a significant change in the longitudinal radius of curvature requires only a small change in the chord length. In the example discussed, supra, for a 60 inch arc length, the chord length, C, for a 720 inch longitudinal radius is 59.998 inches (152.39 cm) and for a 720 inch longitudinal radius is 59.982 inches (152.35 cm). The change in chord length is only 0.017 inches (0.44 cm).

Referring to FIGS. 2 and 9, the forming rolls 32 are mounted on the pivoting frame 36 which pivots on the mainframe 38. Although not limited in the present invention, in the preferred roll forming operation, the end of the roll forming section i.e., roll 264 (shown in FIG. 1 only) of the shaping station 22 is at the lowest elevation of the station. The quench section 24 which starts immediately after the shaping station includes quench rolls 44 which are positioned along a continuation of the arcuate path established by the forming rolls 32 in the shaping station 22 as discussed, supra. Furthermore, a line tangent to the longitudinal radius of curvature at the roll 264 is preferably horizontal. In order to maintain a horizonal tangent line at the interface between the roll forming station 22 and quenching station 24, drive 266 pivots frame 36 about hinge connection 268 on bracket assembly 270 mounted on the frame 38. Specifically referring to FIG. 9, motor 272 is mounted on the frame 38 and connected to screw jack 274 through drive shaft 276 and coupling 278. Pinned connection 280 is fixed to the lower surface of cross beam 282 on pivoting frame 36. Post 284 extends from pinned connection 280 into worm gear screw jack 274 wherein its geared lower end (not shown) meshes with the worm gear (not shown) in the screw jack 274. In operation, motor 272 rotates drive shaft 276 which in turn rotates the warm gear within the screw jack 274 to raise and lower the frame 36 via the post 284. In the example discussed, supra, end 286 of the frame 36 must be moved in vertical distant of approximately 2¼ inches (7.0 cm) when changing from a 720 inch to 7200 inch longitudinal radius of curvature in order to maintain a horizonal tangent line at the roll 264.

It should be appreciated by one skilled in the art that the leaf spring arrangement may include an individual drive for flexing each leaf spring 222. In this fashion the longitudinal radius of curvature along each end of the forming rolls 32 may be different, so as to form glass shapes having a longitudinal radius of curvature that varies in a direction transverse to the glass sheet G as taught in U.S. Pat. No. 4,556,406 to Kahle.

In the particular embodiment of the invention discussed supra, all the adjustments to the roll forming apparatus are driven by motors, i.e., motor 120 of roll flexing drive 118, motor 148 of roll drive 144, motor 232 of leaf spring assembly 34, and motor 272 of pivoting frame 36. With this type of arrangement, all the drives may be connected to a single controller (not shown), in a manner well known in the art, that can automatically adjust all the parameters of the roll forming apparatus. As an alternative, it is understood that each drive may have its own individual control or that the motor may be replaced with a manual type adjustment, such as a handwheel.

The form of the invention shown and described in the specification represents a preferred embodiment thereof. It is understood varies changes may be made without departing from the gist of the invention as defined in the claimed subject matter which follows.

I claim:

1. A roll forming aparatus for shaping heat softened sheet material comprising:
   a support frame;
   longitudinally spaced, transversely extending, adjustable, forming rolls positioned on said frame to support said sheet as said sheet is conveyed thereover;
   means to adjust the transverse curvature of selected ones of said forming rolls in planes generally transverse to the direction in which said material is conveyed over said rolls;
   means to support said forming rolls on said frame along a first longitudinal radius of curvature; and
   means to adjust said supporting means such that said rolls are movable from along said first longitudinal radius of curvature to along a second desired longitudinal radius of curvature.

2. The apparatus as in claim 1 further including means to automatically adjust said support means so as to change the longitudinal radius of curvature along which said rolls are mounted.

3. The apparatus as in claim 1 wherein each of said forming rolls includes a first and second mounting post and said supporting means includes first and second flexible bars extending along opposing sides of said frame, said first post of said rolls being secured to said first bar and said second post of said rolls being secured to said second bar wherein the curvature of each of said bars corresponds to a desired longitudinal radius of curvature along which said rolls are mounted.

4. The apparatus as in claim 3 wherein said adjusting means includes means to automatically adjust the curvature of said flexible bars so as to change the longitudinal radius of curvature along which said forming rolls are mounted.

5. The apparatus as in claim 4 further including means to individually adjust the curvature of each of said bars such that opposing ends of said forming rolls are positioned along a different longitudinal radius of curvature.

6. The apparatus as in claim 4 wherein one end of each of said bars is fixed to a stationary post and the other end is fixed to a pivotally adjusted post.

7. The apparatus as in claim 3 wherein said frame includes a roll support structure pivotally supported on a mainframe and means to pivot said roll support structure about an axis horizontally transverse to the conveyed direction of said heat softened sheet over said rolls and further wherein said support means is mounted on said roll support structure.

8. The apparatus as in claim 7 further including means to simultaneously adjust the transverse radius of curvature of selected ones of said forming rolls.

9. The apparatus as in claim 7 further including a controller to automatically adjust said forming roll supporting means, said roll support structure pivoting means, and said forming roll curvature adjusting means.

10. The apparatus as in claim 7 further including a quench station with quench rolls mounted along a continuation of the longitudinal radius of curvature along which said forming rolls are mounted and means to direct cooling fluid at opposing faces of said heat softened shaped glass sheet, and further wherein the transverse radius of curvature of said quench rolls corresponds to the transverse radius of curvature of said forming rolls.

11. The apparatus as in claim 10 wherein the lowest point of the longitudinal radius of curvature along which said forming rolls and quench rolls are mounted is at the forming roll adjacent said quench rolls.

12. The apparatus as in claim 5 wherein said frame includes a roll support structure pivotally supported on a mainframe and means to pivot said structure about an axis horizontally transverse to the conveyed direction of said heat softened sheet over said rolls and further wherein said support means is mounted on said roll support structure.

13. The apparatus as in claim 12 wherein said forming rolls have a concave upward transverse configuration.

14. The apparatus as in claim 13 further including a quench station with quench rolls mounted along a continuation of the longitudinal radius of curvature along which said forming rolls are mounted and means to direct cooling fluid at opposing faces of said heat softened shaped glass sheet, and further wherein the transverse radius of curvature of said quench rolls corresponds to the transverse radius of curvature of said forming rolls.

15. The apparatus as in claim 14 further including a transition section with forming rolls, each having a successively decreasing transverse radius of curvature relative to the preceeding transition section forming roll.

16. The apparatus as in claim 15 wherein said heat softened sheet material is a heat softened glass sheet.

17. A method of shaping heat softened sheet material comprising:
positioning first and second mounting portions of each of a series of longitudinally spaced, transversely extending adjustable forming rolls on first and second longitudinally extending flexible supports mounted on a support frame to support said material as it is conveyed over said rolls;
flexing each of said flexible supports to correspond to a desired continuous arcuate path corresponding to a desired longitudinal radius of curvature for each of said rolls along said mounting portions;
adjusting the transverse radius of curvature of said adjustable rolls in planes generally perpendicular to the direction in which said material is conveyed over said rolls; and
conveying said heat softened sheet material over said series of rolls to shape said material.

18. The method as in claim 17 further including the step of pivoting said frame about an axis horizontally transverse to the conveyed direction of said sheet over said rolls.

19. The method as in claim 18 further including the step of automatically controlling said flexing of said flexible supports, pivoting of said frame, and adjusting of said forming rolls.

20. The method as in claim 17 further including the step of simultaneously adjusting a plurality of said forming rolls from a preliminary transverse curvature configuration to a final transverse curvature configuration while said sheet material is being conveyed thereover.

* * * * *